United States Patent

Synder, Jr.

[15] 3,649,053

[45] Mar. 14, 1972

[54] TUBING COUPLING

[72] Inventor: Clifford H. Synder, Jr., 173 Rosemont Drive, Coraopolis, Pa. 15108

[22] Filed: June 15, 1970

[21] Appl. No.: 46,104

[52] U.S. Cl..............................285/110, 285/316, 285/321, 285/346
[51] Int. Cl. ...........................................F16l 17/00
[58] Field of Search..................285/110, 345, 346, 316, 111, 285/321, 338

[56] References Cited

UNITED STATES PATENTS 2,543,185  2/1951  Mathieu..............................285/420 X

FOREIGN PATENTS OR APPLICATIONS 1,207,151  8/1959  France...................................285/110
1,122,472  1/1962  Germany...............................285/110

*Primary Examiner*—Dave W. Arola
*Attorney*—George Raynovich, Jr.

[57] ABSTRACT

A coupling is provided which sealingly connects a section of smooth cylindrical tubing to a fluid passage. The coupling includes a rigid housing and a deformable sleeve which is secured within the housing. The deformable sleeve has a free end portion which is in fluid communication with line fluid through the coupling. The end of the sleeve has an annular sealing portion which creates an initial seal against the outer surface of the tubing. The line fluid then deforms the sleeve within the housing to securely grasp the outer surface of the tubing and form a solid seal with the tubing.

7 Claims, 4 Drawing Figures

Patented March 14, 1972

INVENTOR.
CLIFFORD H. SNYDER, JR.
BY *George Raynovich*
ATTORNEY

Patented March 14, 1972

INVENTOR.
CLIFFORD H. SNYDER, JR.
BY
ATTORNEY

TUBING COUPLING

BACKGROUND OF INVENTION

There is a great need for a coupling which can sealingly connect a section of smooth, cylindrical tubing to a fluid passage without distorting or marring the surface of the tubing. It is highly desirable that the tubing conduct high pressure fluid while under a temporary coupling and that the coupling be removable without in any manner damaging the tubing.

In many uses, as for example test stands where tubing must be alternately connected to several different fluid passages, a need for a quickly removable coupling which does not mar nor distort the surface of the tubing has been in evidence. The present invention provides a coupling which meets the foregoing requirements.

SUMMARY

The present invention is directed toward a coupling which may be connected to a smooth, cylindrical tubing and which may sealingly connect the fluid passage to the tubing under great pressure. In the present invention, a deformable cylindrical sleeve is sealingly fixed within a rigid housing. A portion of the deformable sleeve is free from the housing so that the outer portion of the free end of the deformable sleeve is in fluid communication with line fluid through the coupling and the fluid passage. When the tubing is inserted into the sleeve, there is a slight interference fit with the entire surface of the sleeve so that a seal is formed. At the end of the sleeve, there is an annular sealing portion which projects radially inwardly and which forms a tight initial seal against the outer surface of the tubing. This tight initial seal guarantees that no leakage will occur past the sleeve around the outer surface of the tubing. Rather, full line pressure is exerted on the outer surface of the sleeve to force it into sealing contact with the outer surface of the tubing.

It has been found that on a coupling designed for 5/16 inch diameter tubing, line pressures of 1,150 pounds per square inch can be utilized without the tubing being forced out from the coupling.

With the foregoing considerations in mind, it is an object of the present invention to provide an improved tubing coupling.

Another object of the present invention is to provide a tubing coupling without moving parts which permits a sealing connection between a smooth, cylindrical tubing and a fluid passage.

These and other objects of the present invention will become apparent as this description proceeds in conjunction with the accompanying drawings.

DESCRIPTION OF THE PREFERRED EMBODIMENTS

Figure 1:
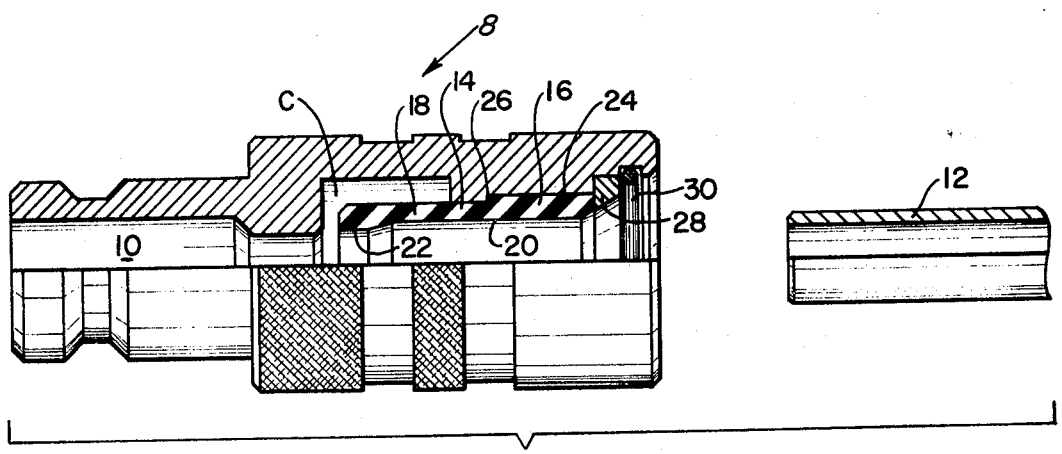
FIG. 1 shows a partial sectional view of the coupling of the present invention in a disengaged position.
Figure 2:
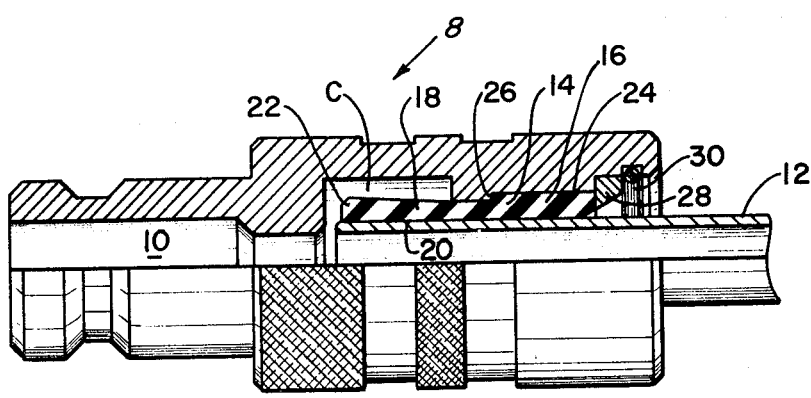
FIG. 2 shows the coupling of the present invention in the engaged position.

Referring to the drawings, and particularly to FIGS. 1 and 2, there is shown a housing 8 having a fluid passage 10 formed therethrough. The housing 8 receives a smooth, cylindrical section of tubing 12 which may be ordinary copper tubing of the type utilized extensively in various plumbing applications.

The housing 8 has a sleeve 14 secured therein. The sleeve 14 is formed of a deformable material. It is preferably formed of a resilient deformable material such as rubber.

The sleeve 14 has a first portion 16 which is in contact with the housing 8 and is sealed against the housing 8. A second portion 18 of the sleeve 14 is free from the housing 8 and does not contact the housing 8 around the outer surface of sleeve 14.

The sleeve 14 has a cylindrical internal surface 20 which is of a size to form a slight interference fit with the cylindrical external surface of the tubing 12. An annular sealing portion 22 is formed on sleeve 14 at the extreme end of the free second portion 18 of sleeve 14. The annular sealing portion 22 extends radially inwardly beyond the cylindrical internal surface 20 of sleeve 14 so that the annular sealing portion 22 forms a tight interference fit with the cylindrical external surface of tubing 12 when tubing 12 is inserted through the sleeve 14.

The sleeve 14 has an enlarged external surface 24 formed upon the first portion 16 of sleeve 14. The enlarged external surface 24 is abutted on one end by a shoulder 26 formed upon housing 8 and at the other end by a washer 28 retained in housing 8 by a snap ring 30. The cooperation of the enlarged external surface 24 with shoulder 26, washer 28, and snap ring 30, serves to axially fix the sleeve 14 relative to the housing 8 so that there is a sealing connection between the first portion 16 of sleeve 14 and the housing 8.

When the tubing 12 is inserted into and through the sleeve 14 as shown in FIG. 2, the annular sealing portion 22 of sleeve 14 makes a sealing contact above the cylindrical external surface of tubing 12. This initial sealing contact prevents leakage of fluid along the external surface of tubing 12 between the sleeve 14 and tubing 12. When fluid under pressure is admitted into passage 10, this fluid enters Chamber C around the external surface of sleeve 14. The fluid under pressure then forces the deformable sleeve 14 radially inwardly into firm contact with the tubing 12. The greater the pressure that is admitted through passage 10, the more forcefully is sleeve 14 forced against tubing 12 to retain tubing 12 within the coupling.

It has been found that utilizing a coupling of the type shown in FIGS. 1 and 2, a 5/16 inch diameter tubing has been retained within the coupling under a fluid pressure of 1,150 pounds per square inch through passage 10. Even at this high pressure, there is no movement of the tubing 12 out of the coupling.

It has also been found that the same coupling can be utilized to seal a vacuum through fluid passage 10 so that there can be, alternately, a vacuum within the passage 10 or a fluid pressure up to 1,150 pounds per square inch without leakage through the coupling and without the tubing 12 being forced out of the coupling.

Figure 3:
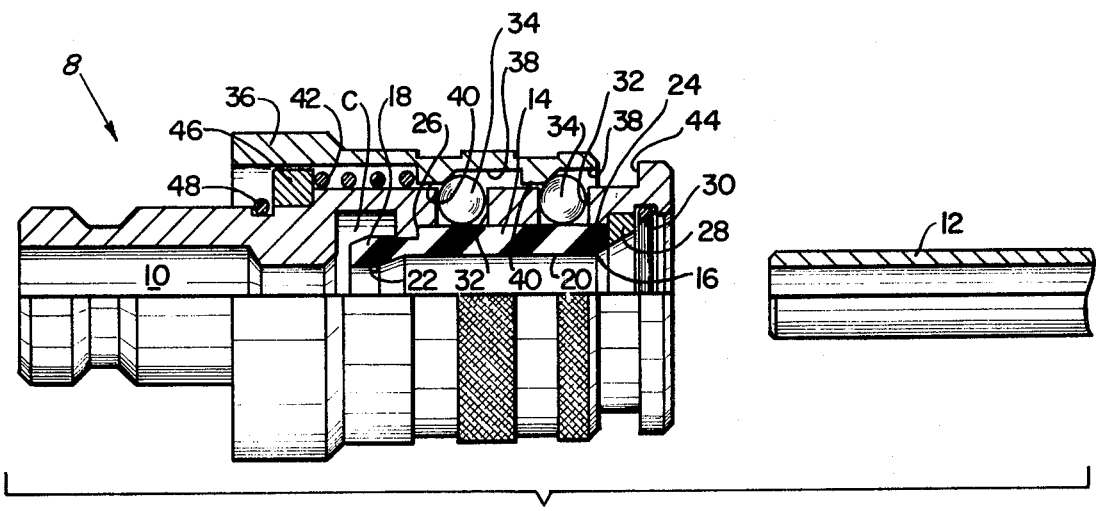
FIG. 3 shows a second species of the present invention in a disengaged position.
Figure 4:
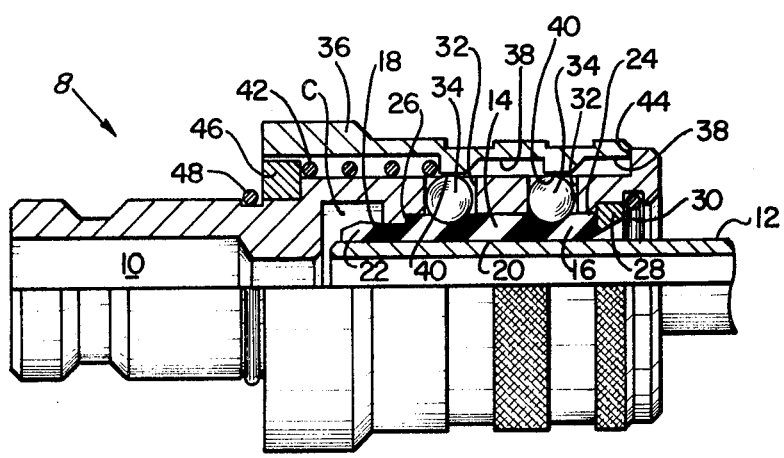
FIG. 4 shows the coupling of FIG. 3 in the engaged position.

The embodiment of the invention shown in FIGS. 3 and 4 is generally similar to that shown in FIGS. 1 and 2, but there is the addition of a lock means on the coupling to provide an additional initial sealing force. It will also be seen that in the coupling of FIGS. 1 and 2, the free second portion 18 of sleeve 14 is longer than the diameter of the sleeve internal cylindrical surface 20. This situation does not prevail in the embodiment shown in FIGS. 3 and 4.

In the embodiment of the invention shown in FIGS. 3 and 4, the portions of the coupling which are the same as those shown in the embodiment of FIGS. 1 and 2 have been given the same reference numerals as were given to the items shown in FIGS. 1 and 2. The description of those portions of the couplings of FIGS. 1 and 2 and the couplings of FIGS. 3 and 4 are identical and will not be repeated here. Rather, the description of the coupling shown in FIGS. 1 and 2 is incorporated herein by reference insofar as the reference numerals shown on FIGS. 3 and 4 are the same as those shown on FIGS. 1 and 2.

In addition to the description of FIGS. 1 and 2, the coupling of FIGS. 3 and 4 has a plurality of radial passages 32 formed through the housing 8. These radial passages receive a like plurality of lock balls 34 which are of a diameter greater than the thickness of the wall of housing 8 into which they are received.

A cylindrical collar 36 is positioned over the housing 8. The collar 36 has annular recesses 38 to receive the lock balls 34 when the collar is in the unlocked position as shown in FIG. 3. The collar 36 also has camming surfaces 40 which force the lock balls 34 radially inwardly against sleeve 14 when the collar 36 is reciprocated to the locked position in the FIG. 4.

A helical spring 42 is provided to urge the collar 36 to the locked position shown in FIG. 4. The helical spring 42 urges collar 36 against a radial stop means 44 formed on the end of housing 8. The spring 42 is retained between the collar 36 and a washer 46 which is held in position by a snap ring 48.

When the coupling is in the disengaged position shown in FIG. 3, the lock collar 36 is in the unlocked position also shown in FIG. 3, after the tubing 12 is inserted through the sleeve 14, the collar 36 is moved axially to the position shown in FIG. 4 so that the lock balls 34 are forced radially inwardly to create a compressive force on sleeve 14 which serves to hold the tubing 12 within the coupling. As in the embodiment of FIGS. 1 and 2, the annular sealing portion 22 of sleeve 14 contacts the tubing 12 to form a seal therebetween.

Fluid pressure through passage 10 enters Chamber C around the outside of sleeve 14 and forces the end of sleeve 14 into contact with tubing 12. The tubing 12 is thereby retained within the coupling under pressure and no leakage of fluid occurs between tubing 12 and sleeve 14.

It may be seen that the coupling of the present invention provides a useful means for sealing a smooth, cylindrical tubing 12 with a fluid passage 10 without marring nor distorting the surface of tubing 12.

According to the provisions of the Patent Statute, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A pressure-responsive, quick-releasable coupling for sealingly connecting a fluid passage to a section of tubing having a smooth cylindrical external surface without distorting said tubing or marring said cylindrical surface comprising:
   a. a rigid housing having a through fluid passage therein, said passage including an intermediate axial, annular chamber in axial communication with and surrounding said passage and of a cross section greater than said passage;
   b. a deformable cylindrical sleeve extending axially within said passage and having:
      1. a first portion of the length of its outer surface in sealing contact with the internal wall of said housing and including means axially restraining said first portion against movement relative to said housing,
      2. a second portion of the length of its outer surface extending axially from said first portion and disposed free from contact with said housing and extending substantially the length of said axial, annular chamber and having a free end terminating short of one end of said chamber, said second portion being in fluid communication with said fluid passage, and
      3. an internal cylindrical surface terminating short of said free end and of a size forming a slight interference fit with said tubing external surface along its entire length when said tubing is inserted into said sleeve, and
      4. an annular sealing portion within said chamber and projecting radially inwardly at the end of said second portion of said sleeve and having an internal diameter substantially less than the diameter of said sleeve internal cylindrical surface whereby said sealing portion forms a tight initial seal against said tubing external surface when said tubing is inserted through said sleeve and insuring that pressure build-up in said chamber will annularly compress said free, resilient second sleeve into increasing sealed relation about said tubing.

2. The coupling of claim 1 wherein said deformable cylindrical sleeve second portion is at least as long as the diameter of said sleeve internal cylindrical surface.

3. The coupling of claim 1 wherein said deformable cylindrical sleeve first portion is restrained axially by having a radially oversize portion which is abutted at one end by a shoulder on said housing and at the other end by a washer retained by a snap ring.

4. The coupling of claim 1 wherein said deformable cylindrical sleeve is formed of a resilient rubber material.

5. The coupling of claim 1 wherein said annular sealing portion is formed at the extreme free end of said deformable cylindrical sleeve second portion.

6. The coupling of claim 1 wherein said housing has lock means constructed thereon to selectively force said sleeve first portion internal surface radially into more forceful contact with said tubing external surface.

7. The coupling of claim 6 wherein said lock means comprises a plurality of balls received in radial passages formed through said housing so that said balls may contact said sleeve, a collar reciprocable over said housing and having annular recesses to receive the said balls in a nonlocking position and annular cam surfaces to force said balls radially inwardly into locking position, and spring means to urge said collar to a position wherein said balls are forced radially inwardly.

* * * * *